United States Patent
Murakoshi et al.

[11] Patent Number: 5,134,514
[45] Date of Patent: Jul. 28, 1992

[54] ROTATABLE POLYGON MIRROR

[75] Inventors: Kazuhiko Murakoshi; Toshio Shimura, both of Hachioji, Japan

[73] Assignee: Konica Corporation, Tokyo, Japan

[21] Appl. No.: 641,607

[22] Filed: Jan. 15, 1991

[30] Foreign Application Priority Data

Jan. 18, 1990 [JP] Japan .................................. 2-9208

[51] Int. Cl.$^5$ .............................................. G02B 26/08
[52] U.S. Cl. .................................... 359/216; 359/217
[58] Field of Search .................... 350/6.5, 6.7, 6.8; 359/197, 212, 216, 217

[56] References Cited

U.S. PATENT DOCUMENTS

| | | | |
|---|---|---|---|
| 4,643,518 | 2/1987 | Taniguchi | 350/6.8 |
| 4,755,731 | 7/1988 | Anthony et al. | 318/662 |
| 4,826,271 | 5/1989 | Takahashi et al. | 350/6.8 |
| 4,842,354 | 6/1989 | Takahashi et al. | 350/6.8 |
| 4,884,856 | 12/1989 | Takeyasu et al. | 350/6.8 |
| 4,889,418 | 12/1989 | Benjamin | 350/486 |
| 4,953,925 | 9/1990 | Parker | 350/6.1 |

FOREIGN PATENT DOCUMENTS

| | | |
|---|---|---|
| 294218 | 12/1988 | European Pat. Off. . |
| 294219 | 12/1988 | European Pat. Off. . |
| 3622 | 9/1989 | Japan . |

*Primary Examiner*—Frank Gonzalez
*Attorney, Agent, or Firm*—Jordan B. Bierman

[57] ABSTRACT

The invention provides a rotatable polygon mixture having a body shaped in a form of polygon. At the axis of rotation of the body is provided a shaft hole, and to each side of said body is provided a mirror surface. The thickness of each center portion of the body corresponding to a portion between the center part of each side and the axis of rotation is made thinner than that of each corner portion corresponding to a portion between the corner part of each side and the axis of rotation to control the flow speed of molding resin.

7 Claims, 3 Drawing Sheets

FIG. I(A)
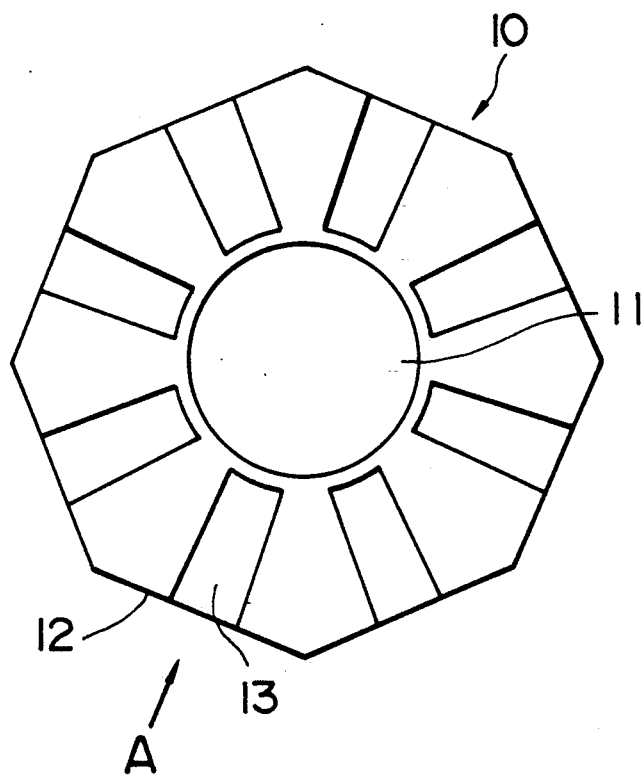
FIG. I(B)
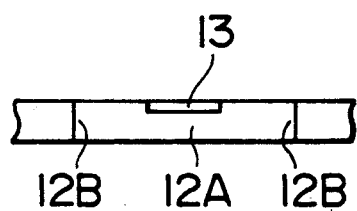

ROTATABLE POLYGON MIRROR

BACKGROUND OF THE INVENTION

The present invention relates to a rotatable polygon mirror to be used in an optical equipment or the like having therein a laser scanning system.

A rotatable polygon mirror to be provided in an equipment or the like having therein a laser scanning system is a prism member whose section is generally a regular polygon such as a regular octagon and whose sides are reflecting mirror surfaces. The purpose of such polygon mirror, for example, is to change an advance direction of a laser beam and thereby to scan a photoreceptor surface.

As a material of such rotating polygon mirror, an aluminum alloy or optical glass has conventionally been used. In case of the former, after being formed to be a regular polygon through machining, it has been finished to be a reflecting mirror surface through machining by means of a carbide tool, while in case of the latter, it has been finished to be a reflecting mirror surface through polishing after being formed to be a regular polygon.

In case of the glass material to be ground and polished mentioned above, it has required a great deal of time to achieve accuracy of flatness on its each side, resulting in the high cost that is ten times or more that of the aluminum alloy to be machined. Even in the case of metal to be machined, a yield rate thereof has been much lower and machining hours required therefor have been much longer than those for moldings due to the difficulty of machining caused by the curvature on the marks produced on the metal surface by a cutting tool during machining or by mold cavities in the material itself, which has resulted in a high cost also from the viewpoints of expenses both for materials and labors.

A rotating polygon mirror made of metallic material or glass material, due to its heavy weight, requires complicated and expensive driving system and control system for high speed rotation. In addition to that, the rotating polygon mirror itself requires a great deal of labor and time in aforesaid manufacturing processes for forming a highly accurate reflecting mirror surface, which has been a problem to be solved.

In view of the situation mentioned above, an attempt to form a rotating polygon mirror using synthetic resin material in place of metallic material or glass is now being made. In case of injection-molding for resin materials, however, molding pressure for resin materials can not be uniform due to the complicated form of the rotating polygon mirror, and thereby warpage and shrinkage caused by internal stress tend to be generated, which has made it extremely difficult to obtain a reflecting mirror surface that is sufficient in terms of mechanical strength and is accurate in terms of flatness.

SUMMARY OF THE INVENTION

An object of the invention is to provide, after solving aforesaid problems for improvement, a rotating polygon mirror made of synthetic resin having an accuracy of flatness that is highly durable compared with a conventional rotating polygon mirror made of metal or glass, by improving partially the shape in the structural portion of a rotating polygon mirror.

Aforesaid object is achieved by a rotating polygon mirror having a hole portion at its center and having mirror-finished polygon surfaces wherein a thickness of the center portion in the radial direction from aforesaid hole portion on the surface of each polygonal segment is thinner than that of the corner portion thereof.

BRIEF DESCRIPTION OF THE DRAWINGS

FIG. 1 and FIG. 2 represent a top view of a rotating polygon mirror of the invention as well as a side view of a primary portion thereof.

DETAILED DESCRIPTION OF THE PREFERRED EMBODIMENT

Figure 2A:
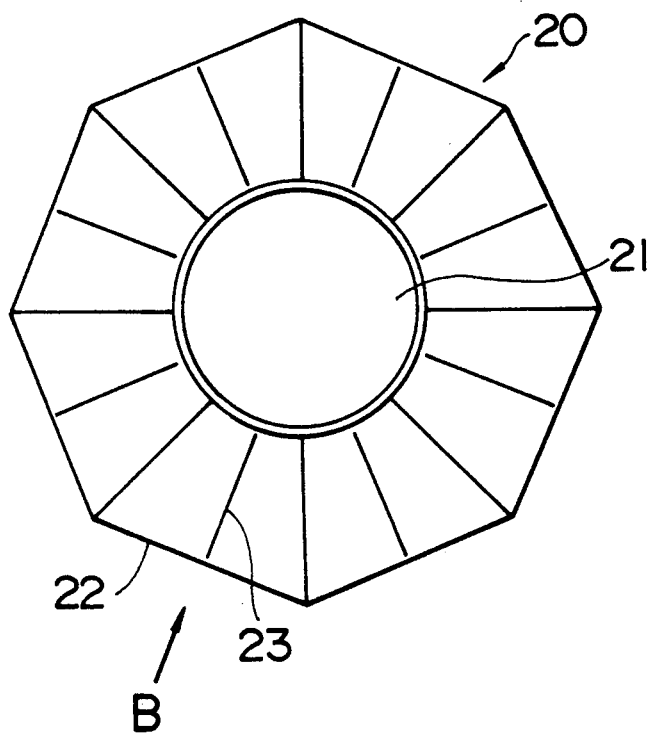
Figure 2B:
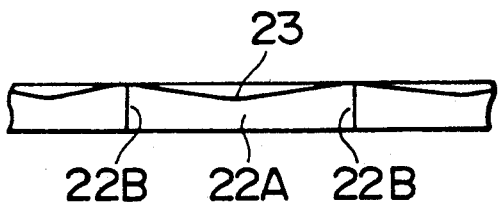
Figure 3A:
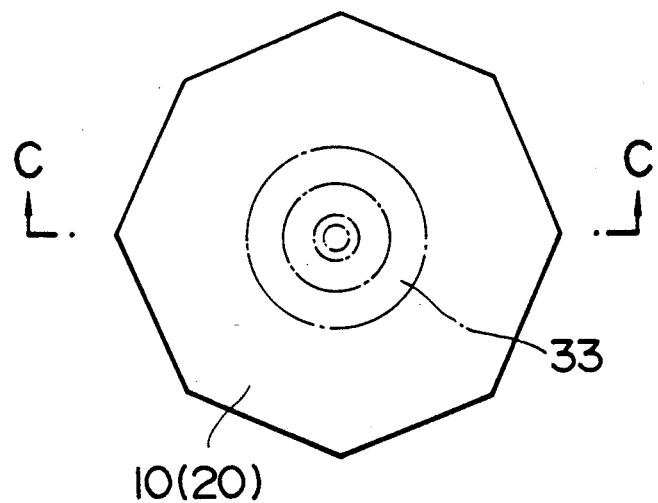
FIG. 3 represents a top view and a cross-sectional view of a gate used for injection molding of aforesaid rotating polygon mirror.
Figure 3B:
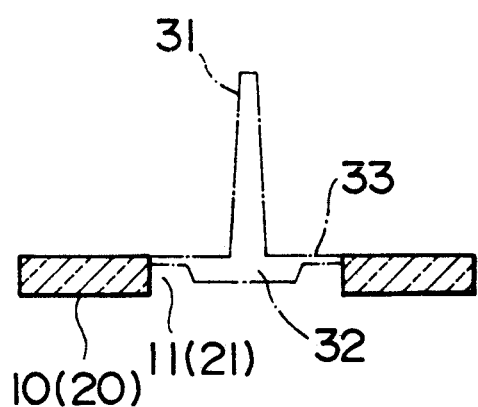

Examples of the invention are shown in FIGS. 1–3. FIG. 1 (A) and FIG. 2 (A) represent respectively the rotating polygon mirror viewed in the direction of an axis of a rotating shaft thereof, and FIG. 1 (B) and FIG. 2 (B) represent respectively a side of the primary portion viewed respectively in the direction of arrow A and arrow B.

Both of rotating polygon mirrors 10 and 20 shown respectively in FIG. 1 and FIG. 2 represent a regular-polygonal prism member made of thermoplastic or thermosetting resin having eight surfaces around its external circumferential surface which is formed through injection-molding to be a radiated plate-shaped molded member having, at its center, hole portion 11 or 21 into which a rotating shaft for driving is inserted.

As a resin material to be used for forming rotating polygon mirrors 10 and 20, polycarbonate resin, for example, is preferably used from the viewpoint that the material is required to offer excellent mechanical strength, an excellent die-releasing characteristic and a high grade finished surface. After the rotating polygon mirror is formed, each of its surfaces mentioned above is subjected to aluminum evaporation to be coated with a metallic film, thereby forming eight mirror-finished surface portions 12 or 22 which further are subjected to coating of $SiO^2$ as a protective layer therefor.

Each of rotating polygon mirrors 10 and 20 is fixed to a driving rotating shaft through each of their hole portions 11 and 21, and it rotates and changes the advance direction of a laser beam emitted on each of aforesaid mirror-finished surface portions 12 and 22 to cause it to scan a photoreceptor surface successively.

A top view of a flow of resin material in the course of forming aforesaid rotating polygon mirror is shown in FIG. 3 (A) and its section viewed along line C—C is shown in FIG. 3 (B), both with a dashed line.

Resin materials pressure-filled in a metal mold are injected, through sprue 31 and runner 32, radially into cavity portions to form aforesaid mirror surface portions.

All of aforesaid mirror surface portions are required to have flatness accuracy of 0.2 μm or the accuracy higher than that. Therefore, for the purpose of preventing strain and deformation caused after molding, it is preferable that stress distribution on each mirror surface portion caused by injection is equalized.

With regard to each mirror surface portion, the distance between the rotation center and each of center portions 12A and 22A is shorter than that between the rotation center and each of corner portions 12B and 22B as is clear from FIGS. 1 and 2. Therefore, when a method for forming by injecting melted resins radially from the rotation center portion, time required for resin to flow and arrive at the center portion of a mirror surface portion is different from that to flow and arrive at the corner portion thereof, which inevitably causes stress distribution to be ill-balanced.

In the invention, therefore, the thickness at each of center portions 12A and 22A of mirror surface portions is made to be smaller than that at each of corner portions 12B and 22B thereof, thereby to control the flowing-in speed of resin to arrive at each of center portions 12A and 22A so as to be slower than that at each of corner portions 12B and 22B.

FIG. 1 shows the first example thereof wherein the thickness at center portion 12A is made to be smaller than that at corner portion 12B by providing stepped recessed portions 13 radially on the same side of center portion 12A on each mirror surface portion 12 of rotating polygon mirror 10.

FIG. 2, on the other hand, shows the second example wherein the thickness at center portion 22A is made to be smaller than that at corner portion 22B by providing recessed portions 23 formed with inclined surfaces radially on the same side of the center portion on each mirror surface portion 22 of rotating polygon mirror 20.

In these examples, time required for resin to arrive at the center portion of a mirror surface portion may be made substantially equal to that at the corner portion.

The width or depth of aforesaid recessed portions 13 and 23 is determined on a method of a trial and error basis while checking a flow pattern of resins based on simulation by means of a computer. This method has been confirmed that it takes much less time compared with a method wherein a metal mold is corrected after forming practically.

Incidentally, dimensions of aforesaid sprue 31, runner 32 and gate 33 are to be determined to the optimum ones in advance based on actual forming conditions.

Owing to the present invention, there has been realized a rotating polygon mirror made of synthetic resin having high flatness accuracy that is equal to or higher than that of a rotating polygon mirror made of metallic material or glass, resulting in the extremely useful rotating polygon mirror that lightens, owing to its lightweight, the load on the driving and control systems and requires less manufacturing expense to realize an extremely reduced production cost due to its capability to be manufactured on a mass production basis.

What is claimed is:

1. A polygonal mirror, rotatable about an axis, comprising a polygonal body which body includes a hole along said axis extending in an axial direction and a plurality of mirrored side faces, said body further comprising a first thickness and a second thickness,
   said first thickness being measured in said axial direction at a vertex portion of said body,
   said second thickness being measured in said axial direction at a center portion between two adjacent vertices of said body,
   wherein said second thickness is smaller than said first thickness.

2. A polygonal mirror of claim 1 wherein said body is made of resin material by injection compression molding.

3. A polygonal mirror, rotatable about an axis, comprising a polygonal body which body includes a hole along said axis extending in an axial direction and a plurality of mirrored side faces, said body further comprising a first thickness and a second thickness, both measured in said axial direction, said first thickness being measured on a first radial line extending from said hole to a vertex, at a first distance from said hole measured along said first line.
   said second thickness being measured on a second radial line bisecting two adjacent vertices, at a second distance from said hole measured along said second line,
   wherein the second thickness is smaller than the first thickness, and said first distance and said second distance are substantially equal.

4. A polygonal mirror of claim 3 wherein said body is made of resin material by injection compression molding.

5. A polygonal mirror, rotatable about an axis, comprising a polygonal body which body includes a hole along said axis extending in an axial direction and a plurality of mirrored side faces,
   said body further comprising a recessed area which is recessed in said axial direction on each radial line extending from said hole to each side face.

6. A polygonal mirror of claim 5 wherein each said recessed area compresses a pair of symmetrical inclined surfaces.

7. A polygonal mirror of claim 5 wherein said body is made of resin material by injection compression molding.

* * * * *